(12) United States Patent
Childs et al.

(10) Patent No.: US 12,396,402 B2
(45) Date of Patent: Aug. 26, 2025

(54) REPOSITIONABLE WINDGUARD ASSEMBLY FOR AGRICULTURAL BALER FEEDER SYSTEM

(71) Applicant: CNH Industrial America LLC, New Holland, PA (US)

(72) Inventors: Albert Childs, Meadville, PA (US); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 864 days.

(21) Appl. No.: 17/589,448

(22) Filed: Jan. 31, 2022

(65) Prior Publication Data

US 2023/0240188 A1 Aug. 3, 2023

(51) Int. Cl.
*A01D 89/00* (2006.01)
*A01F 29/10* (2006.01)

(52) U.S. Cl.
CPC ............ *A01D 89/008* (2013.01); *A01F 29/10* (2013.01)

(58) Field of Classification Search
CPC ....... A01D 89/008; A01F 29/10; A01F 15/10; A01F 15/106
See application file for complete search history.

(56) References Cited

U.S. PATENT DOCUMENTS

| | | | |
|---|---|---|---|
| 2,481,244 A * | 9/1949 | Russell | A01F 15/10 198/817 |
| 2,872,772 A * | 2/1959 | Nolt | A01D 89/008 56/364 |
| 3,924,391 A * | 12/1975 | Cheatum | A01F 15/08 56/364 |
| 4,411,127 A | 10/1983 | Diederich, Jr. et al. | |
| 4,516,389 A * | 5/1985 | Core | A01F 15/106 56/190 |
| 6,295,797 B1 | 10/2001 | Naaktgeboren et al. | |
| 6,877,304 B1 * | 4/2005 | Smith | A01F 15/106 56/364 |
| 7,107,748 B2 * | 9/2006 | McClure | A01D 89/008 56/190 |
| 7,650,741 B2 | 1/2010 | Graber et al. | |
| 7,654,069 B1 | 2/2010 | Dunham et al. | |
| 8,751,115 B2 | 6/2014 | Derscheid | |

(Continued)

FOREIGN PATENT DOCUMENTS

| | | | | |
|---|---|---|---|---|
| DE | 3919889 A1 * | 12/1990 | | A01D 75/187 |
| DE | 102008041331 A1 * | 2/2010 | | A01D 89/008 |

(Continued)

OTHER PUBLICATIONS

Extended European Search Report for EP Application No. 23153962.8 dated Jul. 7, 2023 (seven pages).

*Primary Examiner* — Arpad Fabian-Kovacs
(74) *Attorney, Agent, or Firm* — CM Law PLLC; Stephen J. Weed

(57) ABSTRACT

An agricultural machine includes: a machine frame; and a feeder system coupled with the machine frame and including a windguard assembly, the windguard assembly being configured for selectively occupying a first position and a second position by moving therebetween, the first position being associated with a normal flow direction of a crop material relative to the feeder system, the second position being associated with a reversal of the normal flow direction of the crop material.

12 Claims, 6 Drawing Sheets

(56) References Cited

U.S. PATENT DOCUMENTS

| | | | |
|---|---|---|---|
| 9,681,603 B2 | 6/2017 | McClure et al. | |
| 10,111,387 B1* | 10/2018 | Derscheid | A01D 89/008 |
| 11,547,053 B2* | 1/2023 | Lammerant | A01D 89/008 |
| 11,700,793 B2* | 7/2023 | Tacke | A01F 15/101 |
| | | | 100/142 |
| 12,063,892 B2* | 8/2024 | Babler | A01D 75/187 |
| 12,089,536 B2* | 9/2024 | Childs | A01D 89/008 |
| 2006/0277888 A1* | 12/2006 | Erdmann | A01D 89/008 |
| | | | 56/344 |
| 2008/0163600 A1* | 7/2008 | Schrag | A01D 89/008 |
| | | | 56/341 |
| 2008/0264028 A1 | 10/2008 | Woodford | |
| 2013/0167500 A1* | 7/2013 | Kuhn | A01D 89/002 |
| | | | 56/364 |
| 2014/0250855 A1* | 9/2014 | Vandamme | A01D 89/008 |
| | | | 56/379 |
| 2021/0274716 A1 | 9/2021 | Lammerant et al. | |
| 2023/0240188 A1* | 8/2023 | Childs | A01F 15/10 |
| | | | 56/190 |

FOREIGN PATENT DOCUMENTS

| | | | | |
|---|---|---|---|---|
| EP | 0339733 A1 | | 11/1989 | |
| EP | 1738634 A1 * | | 1/2007 | A01D 61/008 |
| EP | 2067399 A1 | | 6/2009 | |
| EP | 2156729 A2 * | | 2/2010 | A01D 89/008 |
| EP | 2777379 B1 * | | 12/2016 | A01D 34/001 |
| EP | 3912456 A1 | | 11/2021 | |

\* cited by examiner

REPOSITIONABLE WINDGUARD ASSEMBLY FOR AGRICULTURAL BALER FEEDER SYSTEM

FIELD OF THE INVENTION

The present invention pertains to an agricultural baler, and, more specifically, to a windguard assembly of the agricultural baler.

BACKGROUND OF THE INVENTION

Agricultural harvesting machines, such as agricultural balers (which can be referred to as balers), have been used to consolidate and package crop material (which can also be referred to as forage, forage material, or forage crop material) so as to facilitate the storage and handling of the crop material for later use. Often, a mower-conditioner cuts and conditions the crop material and forms it into a swath or windrow to dry in the sun. When the cut crop material is properly dried (depending upon the application), an agricultural harvesting machine, such as an agricultural baler, travels along the swath or windrows (hereinafter, collectively referred to as windrows, unless otherwise specified) to pick up the crop material. Agricultural balers can be, for example, round balers, large square balers, and small square balers, which form the bales into corresponding shapes, as is known.

More specifically, with respect to round balers, pickups of the baler gather the cut and windrowed crop material from the ground, and then convey the cut crop material toward a bale-forming chamber within the baler (that is, the bale chamber). A drive mechanism operates to activate any pickups of a pickup assembly, augers, and/or a rotor (which can be referred to as a feeder) of a rotary feeder assembly of a feeder system. A pickup can convey crop material in an overshot manner, while a rotor can convey crop material toward or into the bale chamber in an undershot manner. A conventional bale chamber of a round baler may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. After wrapping, a cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

The feeder system can include not only the pickup assembly and the rotor assembly, for example, but also a floor, a cutting assembly, and a windguard assembly. The pickup includes a plurality of tines to pick up the crop material disposed in a windrow. The rotor, which is downstream of the pickup, can be positioned above the floor which the crop material traverses prior to entering the bale chamber and can work in conjunction with, and cooperatively with, the cutting assembly. The rotor can include a rotor shaft (extending transversely) and a plurality of tines (which can have a generally triangular or star-shaped configuration) spaced apart across the transverse extent of the baler. The tines are configured to engage and thereby to push the crop material towards the bale chamber and can be grouped in pairs, with a relatively short distance between the tines of a given pair. The floor can include a plurality of slots across the transverse extent of the floor, each slot extending longitudinally in the floor (that is, parallel or otherwise aligned with a direction of crop flow). The cutting assembly can include a plurality of knives (which can also be referred to as cutters) which are selectively received in the slots of this floor, respectively. When inserted through the slots so that the knives extend at least partially above the floor, each respective knife (depending upon the design) can extend between a pair of tines of the rotor, as the rotor shaft rotates the tines. Further, the knives, as they extend through the slots above the floor are configured to cut the crop material to a predetermined length, as the crop material passes by the knives prior to the crop material entering the bale chamber. These knives can be configured to drop at least partially below the floor upon being struck by a foreign object. The windguard assembly can include a roller and a plurality of tines extending aft and can be configured to retain the crop material along at least a part of its flow path as it proceeds rearward by the pickup and the rotor to the bale chamber and, in so doing, can be positioned adjacent to an upper portion of the crop material. Further, the windguard assembly can be pivotably attached to the pickup assembly.

Occasionally, such as with round balers, the crop material becomes plugged in the feeder system. That is, the crop material bunches up so as to form a plug of crop material (which can be referred to as a crop plug), which does not allow, or otherwise at least partially inhibits, the crop material from flowing from the feeder system into the bale chamber. Round balers prone to plugging can have a variable position (drop) floor below the rotor (also known as the feeder) that allows the crop plug to be passed, by increasing a space between the floor and the rotor. Such a drop floor can be effective in unplugging if only the rotor is plugged but often is not effective for unplugging when the crop material is plugged between the windguard assembly and the pickup (resulting in a pickup plug). Such a plug can result, for example, when an operator's ground speed has exceeded the feeding capacity of the baler. When a plug of crop material occurs that cannot be cleared by the drop floor, some operators may use a manually or remotely operated rotor reverser of a reversing system (so as to reverse a direction of the flow of the crop material), which can be useful in loosening the crop material but typically is unable to clear a pickup entirely. The reversing system cannot effectively clear a pickup plug because a conventional construction of windguard assembly geometry acts as a barrier, preventing the flow of the crop material in the reverse direction. For, the tines of the windguard assembly act as barbs, jamming the crop material and thus stopping the reverse flow of crop material and preventing the crop from clearing. Manual removal of the plug, thus, is often necessary for a pickup plug, which often requires the operator to remove the windguard assembly and to pull the crop material out of the pickup assembly by hand—a timely, labor-intensive job which often occurs in uncomfortable field conditions (heat, bugs, dust).

What is needed in the art is a way to reposition the windguard to facilitate removal of a plug of crop material from a feeder system when a drop floor is insufficient to do so, without having to clear the plug manually.

SUMMARY OF THE INVENTION

The present invention provides an agricultural baler with a feeder system including a windguard assembly configured for selectively moving between a plurality of positions, such that a plug of crop material can be removed from the feeder system when the flow direction of the crop material in the feeder system is reversed.

The invention in one form is directed to a windguard assembly of a feeder system of an agricultural baler, the agricultural baler including a baler frame, the feeder system being coupled with the baler frame, the windguard assembly including: the windguard assembly, which is configured for selectively occupying a first position and a second position by moving therebetween, the first position being associated with a normal flow direction of a crop material relative to the feeder system, the second position being associated with a reversal of the normal flow direction of the crop material.

The invention in another form is directed to an agricultural machine, including: a machine frame; and a feeder system coupled with the machine frame and including a windguard assembly, the windguard assembly being configured for selectively occupying a first position and a second position by moving therebetween, the first position being associated with a normal flow direction of a crop material relative to the feeder system, the second position being associated with a reversal of the normal flow direction of the crop material.

The invention in yet another form is directed to a method of using an agricultural baler, the method including the steps of: providing a baler frame and a feeder system, the feeder system being coupled with the baler frame and including a windguard assembly; occupying selectively, by the windguard assembly, a first position, the first position being associated with a normal flow direction of a crop material relative to the feeder system; and occupying selectively, by the windguard assembly, a second position by moving between the first position and the second position, the second position being associated with a reversal of the normal flow direction of the crop material.

An advantage of the present invention is that it provides a windguard design of variable geometry for use with a harvester pickup to allow effective rejection of a crop plug from the machine.

Another advantage is that it provides that, in varying the geometry of the windguard, the windguard, or at least a portion thereof, can be extended forward to open up space for the crop plug to be removed.

Yet another advantage is that it provides that, in varying the geometry of the windguard, the tines of the windguard can be pivoted so that they do not act as barbs when the plug is attempted to be removed.

Yet another advantage is that the windguard assembly does not need to be removed in order to remove a crop plug.

Yet another advantage is that a variation of the geometry of the windguard assembly can be controlled by a controller, based upon sensor feedback, in order to optimize crop feeding. Alternatively, the variation of the geometry of the windguard assembly can be controlled by a user.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
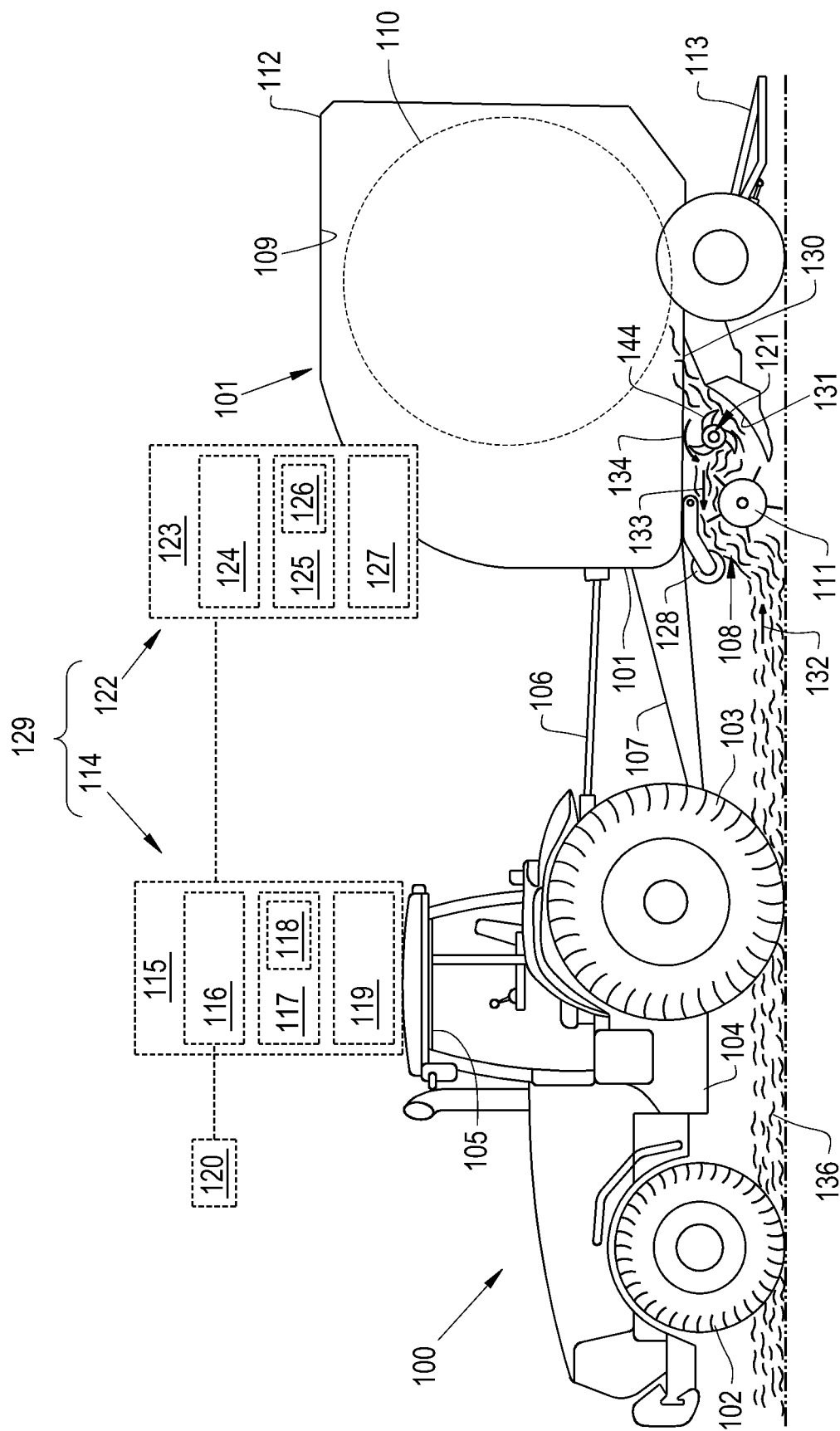
FIG. 1 illustrates a schematic side view of an exemplary embodiment of an agricultural vehicle, formed as a tractor, and an agricultural baler, the agricultural baler including a feeder system including a windguard assembly, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101, in accordance with the present invention, to perform a baling operation within a field (FIG. 1 is generic to all embodiments of the present invention discussed herein). As shown, work vehicle 100 can be configured as an agricultural tractor, such as an operator-driven tractor or an autonomous tractor. However, in some embodiments, the work vehicle 100 may correspond to any other suitable vehicle configured to tow a baler across a field or that is otherwise configured to facilitate the performance of a baling operation, including an autonomous baling vehicle. Additionally, as shown, baler 101 can configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function. While the present invention is described with respect to a baler, it can be appreciated that other the present invention can be used in conjunction with other agricultural machines, such as vehicles and/or implements, such as a self-loading forage wagon.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotary feeder assembly 121, a floor 131, and a windguard assembly 128. Pickup assembly 111 includes a rotating wheel with tines (240) that collect crop material 136 from the ground and direct crop material 136 toward a bale chamber 109 of baler 101 in an overshot manner (rotating clockwise in FIG. 1). In FIG. 1, the tines of pickup assembly 111 rotate in a clockwise direction (as indicated by flow direction 132 of crop material 136), to facilitate crop material 136 to move in flow direction 132. These tines, however, can be reversed (such as by way of operator, control system 122 of baler 101 and/or control system 114 of tractor 100), such that the tines rotate in a counter-clockwise direction in FIG. 1, which can facilitate a reversed flow direction 133 of crop material 136. Rotary feeder assembly 121 includes a rotating shaft (rotor shaft) and a plurality of rotor devices 144 (which can be referred to as rotors 144) mounted to the shaft so as to rotate about the shaft in a counter-clockwise manner (as seen in FIG. 1 and shown by arrow 134), rotors 144 configured to push or otherwise to move crop material 136 towards or into bale chamber 109, in an undershot manner (rotating counter-clockwise in FIG. 1). Feeder system 108 can also include a rotating shaft (not shown in FIG. 1) generally between pickup assembly 111 and rotary feeder assembly 121 that includes side augers for moving crop material 136 inwardly prior to entering bale chamber 109. FIG. 1 shows crop material 136 lying in a windrow on the ground of the field and being picked up by pickup assembly 111 of feeder system 108. Upon being picked up, crop material flow 136 flows over pickup assembly 111, under windguard assembly 128, and under rotary feeder assembly 121, as indicated by arrow 132. Arrow 132 thus indicates the normal flow direction 132 of crop material 136 relative to feeder system 108. Conversely, arrow 133 shows the flow direction which is opposite the normal flow direction of crop material 136; this opposite flow direction 133 can also be referred to as a reverse flow direction 133 (that is, a reversal of normal flow direction 132). Thus, the flow direction (whether normal 132 or reversed 133) of crop material 136 can be facilitated by the normal or opposition rotational direction of pickup assembly 111 and/or rotary feeder assembly 121. FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111, rotary feeder assembly 121, and windguard assembly 128 are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, such as a self-loading forage wagon. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123 of baler 101, as indicated in FIG. 1, can be in communication with controller 115 of work vehicle 100, thereby forming a unified control system 129, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center (which can also be a part of unified control system 129), which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
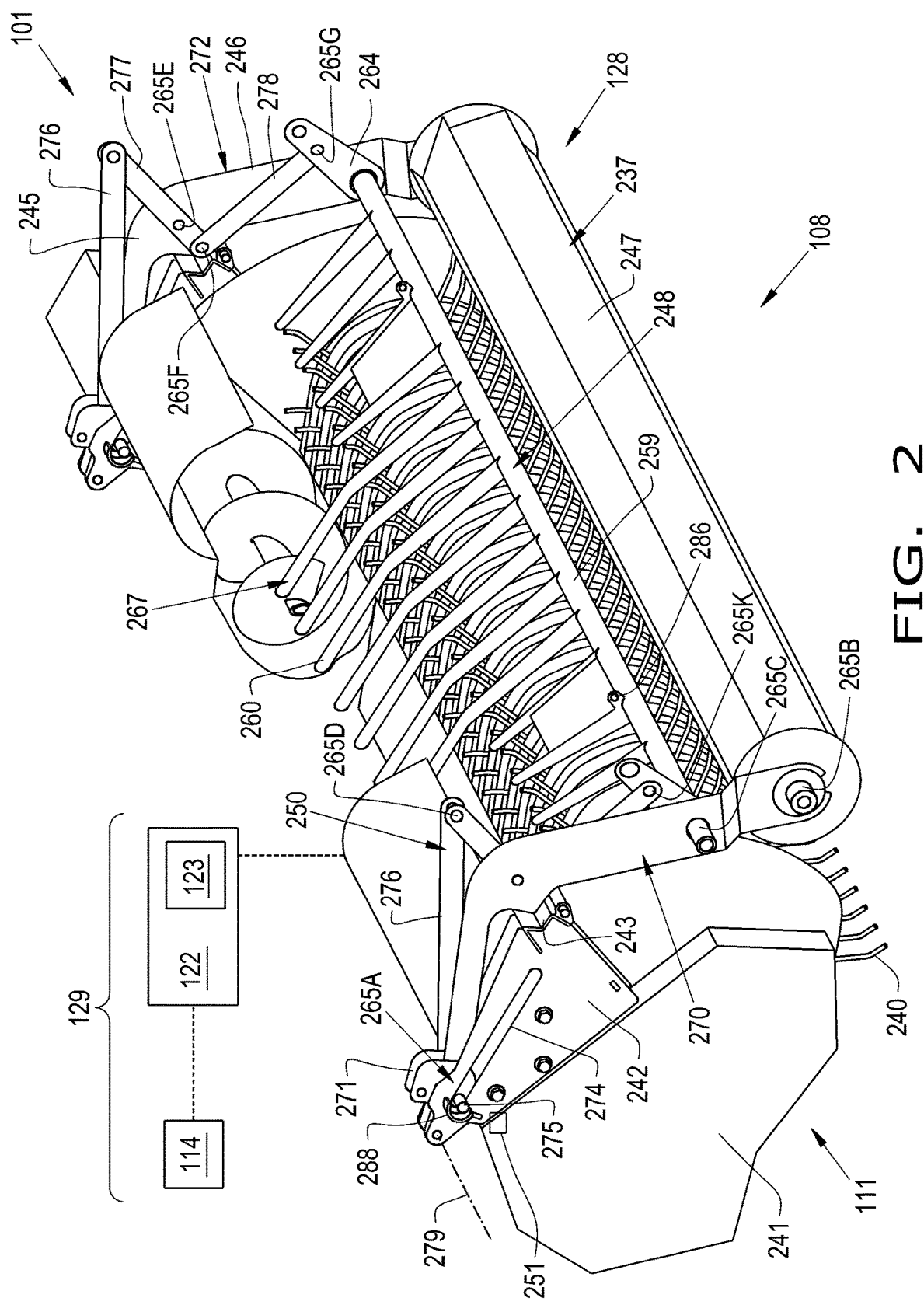
FIG. 2 illustrates a perspective view of an exemplary embodiment of the feeder system of the agricultural baler, the feeder system including the windguard assembly in a first position, with portions broken away, in accordance with an exemplary embodiment of the present invention.

Referring now to FIG. 2, there is shown baler 101 with portions broken away. Baler 101 includes baler control system 122 and feeder system 108. Control system 122, which includes controller 123 and can include sensor(s) 535A, 535B (FIG. 5), can be a part of unified control system 1129, which also includes tractor control system 114. Feeder system 108 includes pickup assembly 111, rotary feeder assembly 121 (FIG. 1), and windguard assembly 128, which is shown in first position 237. Pickup assembly 111 includes a plurality of pickup tines 240, pickup frame 241, and a latch 271. Pickup tines 240 are configured to pick up the windrow of crop material 136 from the ground as tines 240 rotate in a counter-clockwise direction (as viewed from the bottom left of the page of FIG. 2), with crop 136 moving in a normal flow direction 132 once picked up by tines 240. Pickup frame 241 (which can be referred to as frame 241) includes a windguard mounting device 242 on each lateral side of feeding system 108, which can be fastened to other portions of pickup frame 241, such as by way of rivets or threaded fasteners, such as bolts or screws, or the like. Windguard mounting device 242 (as indicated in FIG. 2) can include two plates spaced transversely apart and coupled with one another, such as by way of joinder devices positioned at the bottom left and bottom right of windguard mounting device 242 in FIG. 2, as well as a stop mechanism 243. Windguard mounting device 242 further includes stop mechanism 243 configured to selectively receive thereon a portion of windguard assembly 128; windguard mounting device 242 can be attached to pickup frame 241 in any suitable manner, such as by way of welding or by way of fasteners. Pickup frame 241 and windguard mounting device 242 can each be made of any suitable material, such as steel or a polymer. Latch 271 is configured for selectively latching (that is, holding in place) shaft 275 of arm 270 in first position 237 and thus in rearward position 272, as indicated in FIG. 2. Latch 271 is pivotably coupled with windguard mounting device 242, such as by way of shaft, so as to rotate about an axis of rotation 279 extending transversely through this shaft. Latch 271, as indicated in FIG. 2, can include two like plates spaced transversely apart and positioned within and respectively adjacent to the two plates of windguard mounting device 242. The two plates of latch 271 can be rigidly coupled to one another by the shaft forming axis of rotation 279, this shaft being mounted in respective mounting holes formed by each of the plates of latch 271. In FIG. 2, latch 271 is in its normal position, a latching position, and thus pivoted downwards. In this way latch 271 can be biased into this latching position in any suitable manner, such as by way of a spring (not shown). Upon applying a force, latch 271 can be pivoted upwardly (counter-clockwise, viewed from the bottom left in the page of FIG. 2) so as to release shaft 275, so that shaft 275 can slide forward. Latch 271 can be made of any suitable material, such as steel, a polymer, or carbon fiber, and can be made in any suitable manner, such as stamping, metal forming, welding, and/or injection molding. Further, though not shown in FIG. 2, rotary feeder assembly 121 of feeder system 108 includes rotors 144, each of which includes a plurality of generally triangular shaped tines (as is known), the rotors 144 being configured to move crop material 136 towards bale chamber 109 as rotors 144 rotate. Thus, for example, rotors 144 move crop material 136 toward bale chamber 109 in normal operation, and when reversed rotors 144 can facilitate removal of a crop plug.

Windguard assembly 128 includes an arm 270, roller 247, tine mechanism 248, a chain assembly, linkage assembly 250, actuator 251 (according to an optional embodiment), and connections A, B, C, D, E, F, G. Windguard assembly 128 can be substantially similar on both lateral sides of windguard assembly 128, such that a description of one lateral side of windguard assembly 128 substantially serves as a description of the opposing lateral side of windguard assembly 128. Windguard assembly 128 is configured for selectively occupying a first position 237 and a second position 338, the first position 237 being associated with normal flow direction 132 of a crop material 136 relative to feeder system 108, second position 338 being associated with a reversal of the normal flow direction 132 of the crop material 136 (and thus a reversed flow direction 133). In general, first position 237 is when windguard assembly 128 occupies, at least in part, a rearward position 272 (as in FIG. 2), and second position 338 is when windguard assembly 128 occupies, at least in part, a forward position 373 (as in FIG. 3).

Arm 270 can be positioned between the two plates of windguard mounting device 242. Arm includes a first section 245 and a second section 246 which is disposed at an angle (not 180 degrees) relative to first section 245 and can be formed integral with first section 245 (such that first and second sections 245, 246 are not pivotable relative to one another). Arm 270 can be made of any suitable material, such as steel, a polymer, or carbon fiber, and can be made in any suitable manner, such as stamping, metal forming, welding, and/or injection molding. First section 245 can be positioned closer to, or adjacent to, an inboard one of the plates of windguard mounting device 242. First section 245 can include a transversely extending pin, shaft, or the like (hereinafter, shaft 275), by way of which first section 245 is pivotably and slidably coupled with windguard mounting device 242 at a slot 274 formed respectively by each of the plates of windguard mounting device 242, the opposing ends of shaft 275 extending respectively into slot 274 formed by these plates of windguard mounting device 242; this coupling between shaft 275 of arm 270 and slot 274 is connection 265A. Thus, arm 270 is configured for moving, such as sliding, between a rearward position 272 and a forward position 373 by way of shaft 275 and slot 274. That is, arm 270, by way of a shaft 275 of first section 245, pivots and slides within slot 274 formed in windguard mounting device 242. When arm 270 is in rearward position 272, shaft 275 is positioned at a rearward end of slot 274; and, when arm 270 is in forward position 373, shaft 275 is positioned at a forward end of slot 274. Second section 246, in FIG. 2, is shown to be resting on stop mechanism 243 (if second section 246 were not resting on stop mechanism 243, then second section 246 can be supported and thus suspended by a chain 461 (FIG. 4) or can be supported by crop material 136). Second section 246 is pivotably connected with roller 247 at connection 265B. Connection 265B can be made by any suitable connectors and/or fasteners, such as rivets, pins, screws, nuts, washers, bearings, and/or bolts. Roller 247 extends between opposing second sections 246 across a front portion of windguard assembly 128 and can pivot in either direction, as is known, as crop material 136 contacts roller 247. Though the windguard assembly of the present invention is discussed as having a roller, it can be appreciated that the present invention is not limited to a type of windguard assembly having a roller (and thus includes windguard assemblies without a roller). With arm 270 in rearward position 272 in FIG. 2, tine mechanism 248 is in down position 267. Thus, arm 270 is configured for being pivotably coupled with pickup assembly 111 when latched by latch 271 (by way of shaft 275 in slots 274) and is configured for being slidably coupled with pickup assembly 111 (by way of shaft 275 in slots 274) when unlatched by latch 271.

Tine mechanism 248 includes a bar 259 (which can also be referred to as a tube 259, or tine bar 259) and a plurality of tines 260 rigidly connected to bar 259, tines 260 projecting generally in an aft direction. Bar 259 is pivotably coupled with second section 246 at connection 265C, such that bar 259 can extend through each second section 246 (this is different than a known prior art device, wherein a tine bar is welded to an arm). Connection 265C can be made by any suitable connectors and/or fasteners, such as rivets, pins, screws, nuts, washers, bearings, and/or bolts. Tines 260 are configured for riding on a top portion of crop material 136 as crop material flows through feeder system 108 and thereby serves, at least in part, to retain crop material 136 within feeder system 108 and on a proper path to bale chamber 109. Tine mechanism 248 can be made of any suitable material, such as steel, a polymer, or carbon fiber, and can be made in any suitable manner, such as stamping, metal forming, welding, and/or injection molding. Tine mechanism 248 can further include a hook or loop 286 configured to receive therethrough a link of a bottom end of a chain, such as chain 461 (FIG. 4) of a chain assembly. Tine mechanism 246 can include two such loops 286 on opposing sides of tine mechanism 248 (as seen in FIG. 2), each loop 286 receiving therethrough a bottom end of a respective chain 461.

The chain assembly can include one or more chains 461 (FIG. 4), such as two chains, as indicated by two loops 286 shown in FIG. 2). Each chain 461 can extend between a respective loop 286 of tine mechanism 248 and a front portion of baler 101 on baler frame 130 so as to be pivotal at each such connection. Whereas the bottom end of chain 461 connects with loop 286, the top end of chain 461 connects with a hook 487 connected to the front portion of baler 101 on baler frame 130. Hook 487 can be connected to a bracket with a flat surface facing forward, and this bracket can be connected with a transversely extending bracket of baler 101. Chain 461 can thereby hold (suspend) and thus support at least portions of windguard assembly 128 when such portions of windguard assembly 128 are not otherwise supported, for example, by stop mechanism 243, crop material 136, and/or (if provided) actuator 251. When chain 461 supports portions of windguard assembly 128, chain 461 can be taut, and when it does not chain 261 can be slack. The chain assembly can also include a chain sleeve surrounding a portion of chain 461, such as near a bottom end of chain 461; this chain sleeve can be a relatively rigid material, such as a plastic pipe, and or made of flexible material. For high volume plugs of crop material 136, windguard roller 247 may roll over the top of the plug, in which case support chains 461 can be slack.

Linkage assembly 250 includes a first linkage 276, a second linkage 277, a third linkage 278, and a fourth linkage 264. Linkage assembly 250 can be positioned to the inside (inboard side) of arm 270, as shown with linkage assembly 250 in the foreground of FIG. 2. Alternatively, linkage assembly 250 can be positioned entirely to the outside (outboard side) of arm 270 (not shown). First linkage 276 is pivotably coupled at a proximal end of first linkage 276, at a pivot connection, with pickup assembly 111 by way of a tube 288 (which can have a hemispherical cross-section as shown, so that shaft 275 can slide forward in slot 274) of pickup assembly 111. Tube 288 can extend through both plates of windguard mounting device 242, can be attached to the exterior of each plate (not running through the interior), or can be attached only to the exterior of the inboard plate. First linkage 276, at its proximal end, can have a hole through which tube 288 extends, so that first linkage is pivotably coupled with tube 288 (the proximal end of first linkage 276 can have a widened end so as to accommodate the radius of tube 288). Thus, first linkage 276 can be positioned to the inboard side of the inboard plate of windguard mounting device 276 and pivotally mount to tube 288 (alternatively, rather than being coupled with tube 288, first linkage 276 can be coupled with a bracket, such as the bracket shown in FIG. 2 projecting to the rear of windguard mounting device 242). Further, first linkage 276 is pivotably coupled with second linkage 277 at pivot connection 265D. Second linkage 277 is pivotably coupled with arm 270 at pivot connection 265E and with third linkage 278 at pivot connection 265F. Third linkage 278 is pivotably coupled with fourth linkage 264 at pivot connection 265G. Fourth linkage 264 is rigidly coupled with tine bar 259, such as by welding. Linkage assembly 250 is configured for moving tine mechanism 248 between down position 267 and up position 368 when arm 270 slides between rearward position 272 and forward position 373. Thus, the present invention provides linkage assembly 250 which is configured for rotating and thereby for changing an angle of tines 260 dependent on pivot connection 265C. First, second, third, and fourth linkages 276, 277, 278, 264 can be made of any suitable material, such as steel, a polymer, or carbon fiber, and can be made in any suitable manner, such as stamping, metal forming, welding and/or injection molding.

Actuator 251 is shown schematically in FIG. 2. Actuator 251 can be in any form (such as a linear or a rotary actuator, a hydraulic actuator, a pneumatic actuator, or an electric actuator), but is described herein as a hydraulic actuator assembly 251, with a cylinder, a piston in the cylinder, and a rod attached to and movable with the piston, as is known. Actuator 251 can be mounted to the outside or inside of pickup frame 241, optionally in whole or in part to windguard mounting device 242 (only one actuator 251 can be used, or an actuator 251 can be positioned at each transverse end of windguard assembly 128). The cylinder can be positioned aft, and the rod can be positioned fore; thus, a distal end of the rod can be coupled (for example, pivotably) with shaft 275 so as to be able to move arm 270 forwardly and rearwardly as the rod extends and retracts relative to the cylinder. In this way a rearward end of the cylinder of hydraulic cylinder assembly 251 can be coupled with frame 241 (or, more specifically, windguard mounting device 242), and a forward end of the rod can be coupled (i.e., pivotably) with shaft 275, or any other portion of first section 246 of arm 270. Nevertheless, using an actuator, such as actuator 251, is but one embodiment of the present invention. Thus, actuator 251, according to another embodiment of the present invention, can be omitted altogether. Omitting actuator 251, windguard assembly 128 can be slid forward and backward manually by an operator, according to one embodiment of the present invention.

On the other hand, according to another embodiment of the present invention that omits actuator 251, windguard assembly 128 can be slid forward and backward (the repositioning of windguard assembly 128) by the movement of crop material 136, rather than by an actuator or manually. Thus, windguard assembly 128 can be thought of as floating on top of crop material 136. Once latch 271 releases windguard assembly 128 and as the crop flow direction is reversed (133), windguard assembly 128 will float on top of the reversing crop material 136, and the movement of crop material 136 can cause windguard assembly 128 to be moved forward (from rearward position 272 to forward position 373 and thus from first position 237 to second position 338, which also entails tine mechanism 248 moving from down position 267 to up position 368). This movement forward of windguard assembly 128 can be further enhanced (assisted) if the travel direction of baler 101 is reversed (by reversing tractor 100). Thus, the pile (plug) of crop material 136 will assist with moving windguard assembly 128 out of the way from plugging feeder system 108. In order to move windguard assembly 128 back to its normal operating position (that is, first position 237, which entails windguard assembly being in rearward position 272 and tine mechanism 248 being in down position 267), tractor 100 can be driven forward (causing baler 101 to move forward) into the ejected crop pile/windrow, windguard assembly 128 will be pushed (by way of crop material 136) back up through slots 274 and will be latched by latch 271 and into the normal operation position. Thus, in operation, when a plug is detected (manually by the operator, or by a sensor (not shown)), a controller (such as baler controller 123 and/or tractor controller 115) can be used to reverse the normal rotor direction 134 of rotors 144 of rotary feeder assembly 121 (by way of an actuator (not shown)) and/or the normal direction of tines 240 of pickup assembly 111 (by way of an actuator (not shown)) in order to reverse the flow direction (133) of crop material 136 without an actuator for directly moving windguard assembly 128 in an unplugging event. In this way, the sliding forward/backward of windguard assembly 128 can be accomplished by interaction with the flow direction of crop material 136, and the operator can control the unplugging while remaining in the comfort of cab 105.

Figure 3:
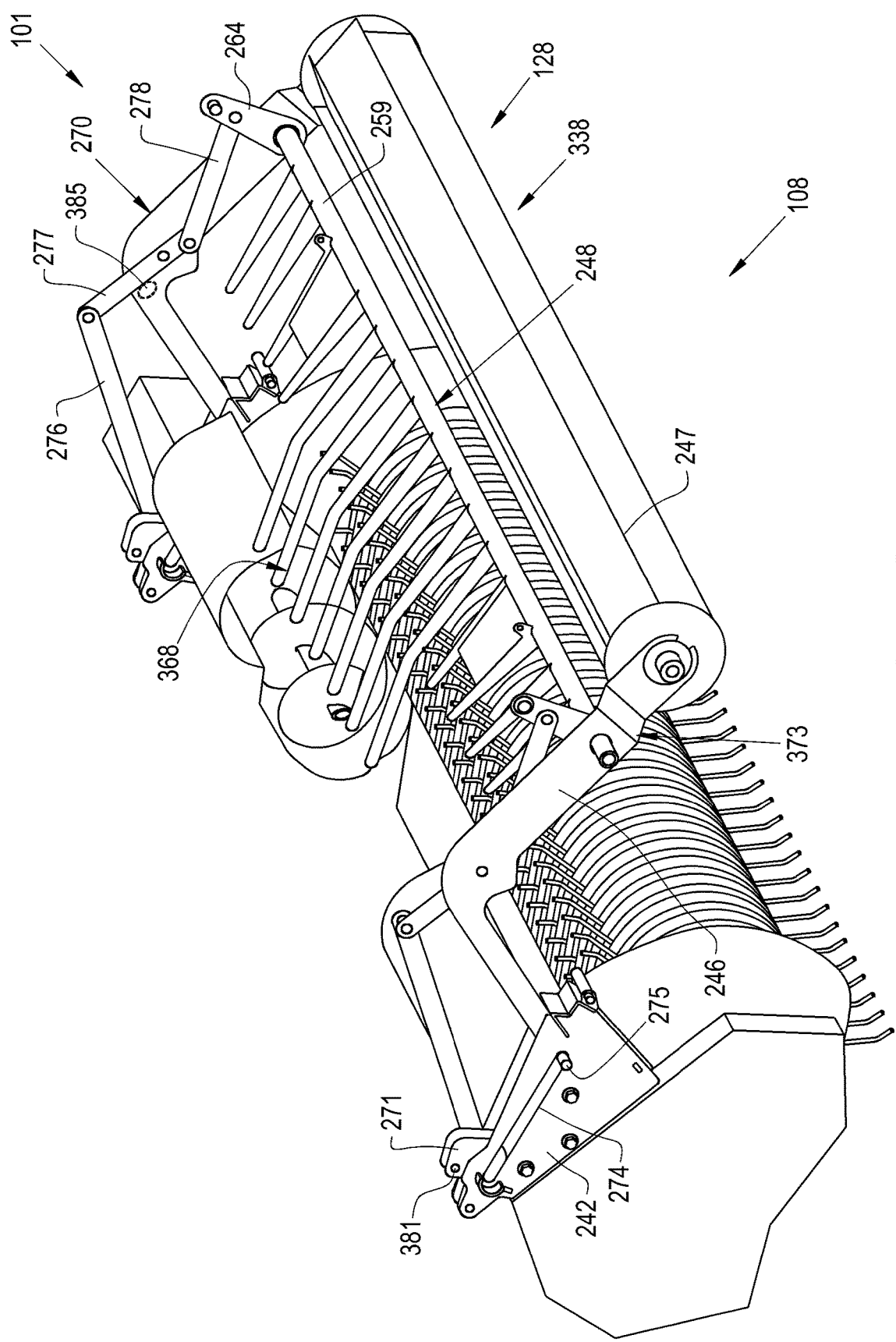
FIG. 3 illustrates a perspective view of the feeder system of FIG. 2, the windguard assembly being in a second position, with portions broken away, in accordance with an exemplary embodiment of the present invention.
Figure 4:
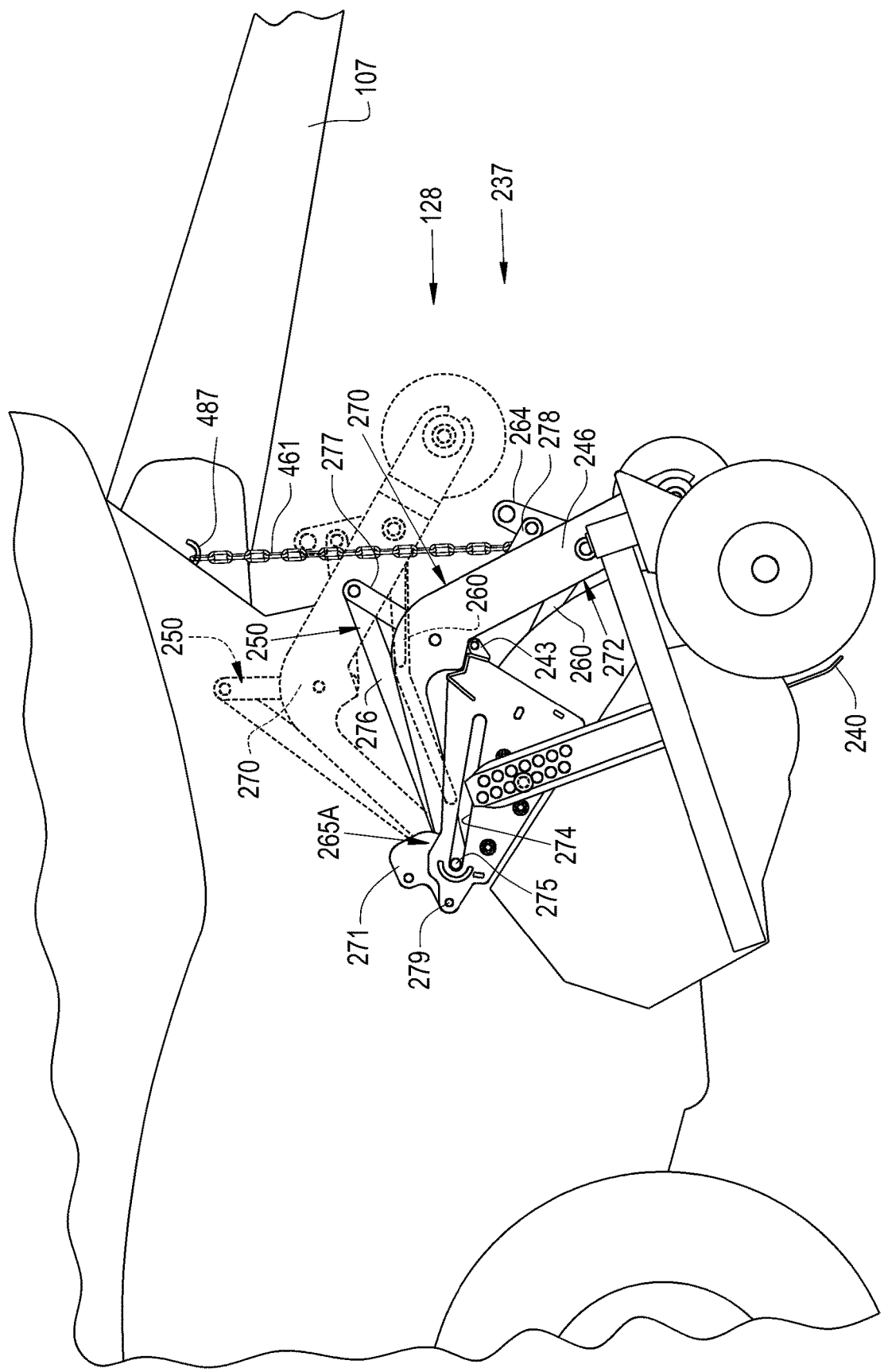
FIG. 4 illustrates a side view of the feeder system of FIG. 2, the windguard assembly being in the first position, with portions broken away.

Referring now to FIG. 3, there is shown baler 101 with feeder system 108, with windguard assembly 128 being in second position 338. As such, arm 270 is in forward position 373, and tine mechanism 248 is in up position 368. Roller 247 (and thus also, in part, arm 270) can be supported by crop material 136 (such as a crop plug), or second section 246 of arm 270 can be supported, in part, by a chain 461 (FIG. 4). In FIG. 3, arm 270 at shaft 275 has slid forward in slots 274. With the use of latch 271, latch 271 has to release shaft 275 in order for arm 270 to slide forward in slots 274. Thus, latch 271 must be rotated upwardly (counter-clockwise), and then arm 270 can be slid forward. Once arm 270 has slid forward, latch 271 can be released to return to its down position (as shown in FIG. 3). Moving latch 271 upward in order to release arm 270 can be accomplished in any suitable way; for example, (1) a user can pull on a rope, cable, or the like, by hand to pull latch 271 upwardly, and this rope or cable can be attached to latch 271 at hole 381; (2) an actuator (not shown) can move latch 271 in order to release arm 270, the actuator being of any suitable type (i.e., hydraulic, pneumatic, electric, linear, and/or rotary); or (3) latch 271 can be moved by being connected to and thus triggered by another baler function. As arm 270 slides forward in slots 274, first linkage 276 begins a chain of causation through second, third, and fourth linkages 277, 278, 264 to cause tine bar 259 to rotate upwardly to up position 368. Further, an inside of each arm 270 can include thereon a stop device 385 (shown in broken lines), which can help linkage assembly 250 from overextending in either direction (by contacting first linkage 276 in first position 237, and/or by contacting second linkage 277 in second position 338). Stop device 385 can be made of any suitable material, such as steel, a polymer, or carbon fiber, and can be formed integral with arm 270 or welded thereto, for example.

Referring now to FIG. 4, there is shown a side view of baler 101, in particular, feeder system 108, with portions broken away. Windguard assembly 128 is shown in two orientations, both of which are in first position 237 (which is the normal operation position for windguard assembly 128). Regarding the first orientation (the side view of what is shown in FIG. 2, with windguard assembly 128 shown in solid lines), second section 246 of arm 270 is resting on stop mechanism 243. This orientation can occur when windguard assembly 128 encounters little or no crop material 136. Regarding the second orientation, arm 270 is pivoted further upwardly (in a counter-clockwise direction) about shaft 275 and connection 265A, which can be to a maximum extent. This orientation can occur when windguard assembly 128 encounters a relatively large volume of crop material 136, which can cause arm 270 to pivot upward. Further, though arrow 132 is not shown in FIG. 4, crop material 136 is understood to flow in the normal flow direction 132 relative to pickup assembly 111, rotors 144, and floor 131. Further, latch 271 can pivot about axis of rotation 279.

Figure 5:
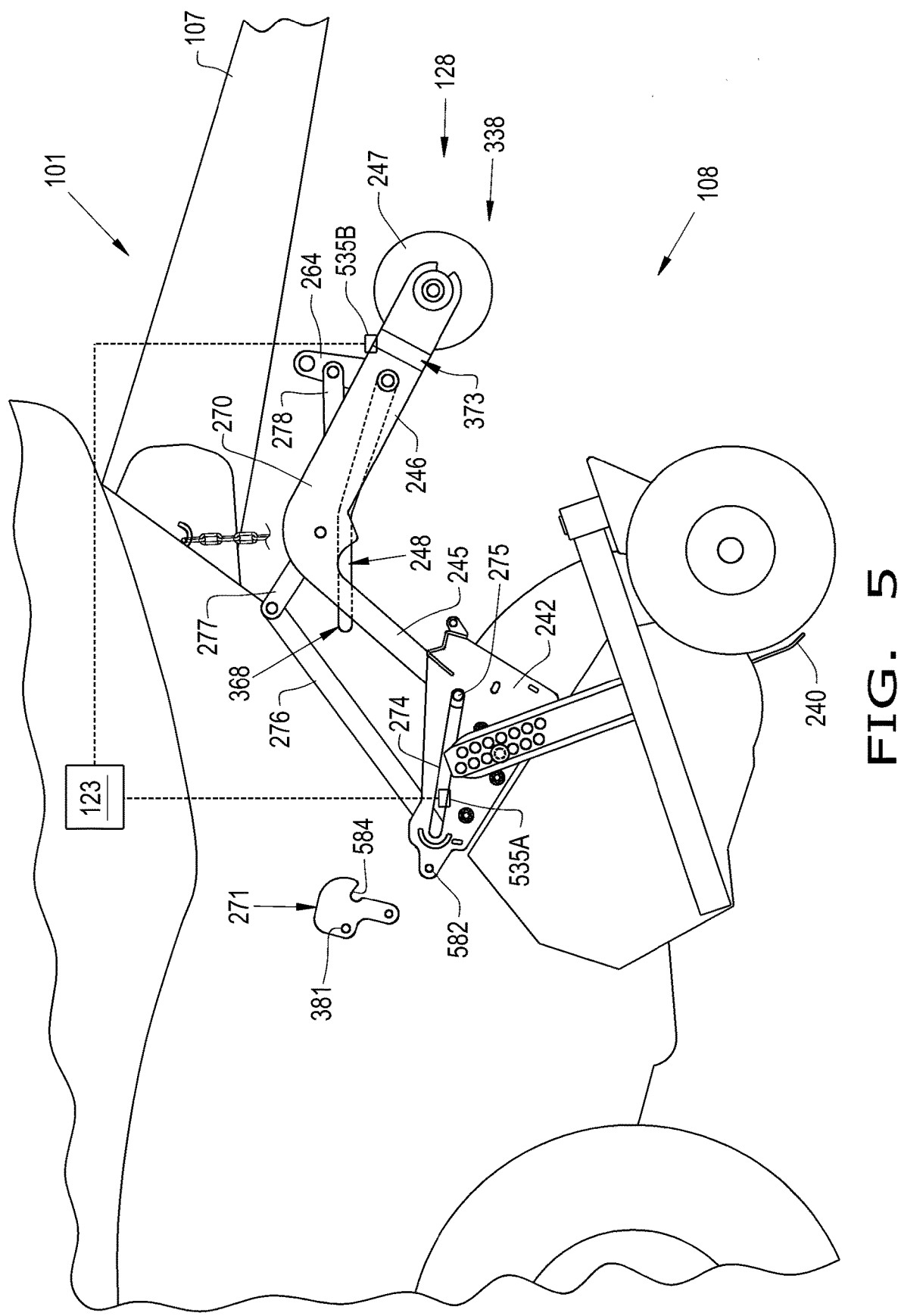
FIG. 5 illustrates a side, partially exploded, view of the feeder system of FIG. 2, the windguard assembly being in the second position, with portions broken away.

Referring now to FIG. 5, there is shown a side view of baler 101, in particular, feeder system 108, with portions broken away. Windguard assembly 128 is shown in second position 338, with arm 270 being slid to forward position 373, and thus with tine mechanism 248 in up position 368 (this side view is substantially similar to what is shown in FIG. 4). Latch 271 is shown exploded from windguard mounting device 242. Latch 271 is shown to include hole 381 for a rope or cable, a hole 582 in which to make the pivot connection between latch 271 and windguard mounting device 242. Latch 271 also includes a mouth 584 which can capture arm 270, such as by way of shaft 275.

Further, FIG. 5 shows that baler control system 122 can further include sensor(s) 535A and/or 535B (shown schematically) which are operatively coupled with controller 123 (and also controller 115), though more or less sensors can be employed (alternatively, the present invention is not required to be used in conjunction with sensors, such as position sensors 535A, 535B, but the present invention can function by user controlling, for example, hydraulic remotes/valves manually, with sensors being absent). Each sensor 535A, 535B can be a position sensor for sensing a position of windguard assembly 128, so as to determine whether windguard assembly 128 is in first position 237, second position 338, or some intermediate position therebetween. Sensor 535A can sense a position of actuator 251 (such as whether the rod extended or retracted), a position of arm 270 and/or shaft 275, and/or an angular position of first linkage 276. Sensor 535B can be positioned to sense a position of third linkage 278 relative to fourth linkage 264, a position of fourth linkage 264 and/or bar 259 relative to second section 246, and/or a position of tines 260 relative to second section 246. In sensing the position of third linkage 278 relative to fourth linkage 264, sensor 535B can be positioned on or near third or fourth linkage 278, 264 and can be configured to sense an angular position of third linkage 278 relative to fourth linkage 264. In sensing the position of fourth linkage 264 and/or bar 259 relative to second section 246, sensor 535B can sense an angular position of fourth linkage 264 and/or bar 259 relative to second section 246. In sensing the position of tines 260 relative to second section 246, sensor 535B can sense a linear or angular position of tines 260 relative to second section 246. Alternatively or in addition thereto, other position sensors can be used to sense the position of other structure that would be indicative of the position of windguard assembly 1128. Sensors 535A, 535B can output their position signals (corresponding to the sensed position of the referenced structures) to controller 123 (and/or controller 115), which can receive the position signals and output an adjustment signal to feeder system 108 based upon these position signals. The adjustment signals can reposition windguard assembly 128 depending upon the circumstances, and/or change the direction of rotors 144, in order to unplug crop material 136 or to resume normal operations.

Alternatively or in addition thereto, control system 129 can be configured to automatically unplug feeder system 108 of a plug of crop material 136, without the user having to enter a command to do so (this alternative can occur with a user operating tractor 100 pulling baler 101, or with autonomous tractor and/or baler operations). Though not shown, control system 122 of baler 101 can include at least one sensor configured for: (a) sensing a plug of crop material 136 in feeder system 108 (for example, optical sensors detecting a profile of crop material 136 indicative of a plug of crop material, and/or weight sensors detecting a weight of crop material 136 indicative of a plug of crop material 136, and/or any other sensor(s) suitable for detecting a plug of crop material 136); and (b) outputting a plug signal corresponding to the plug sensed by the sensor. Controller 123 (and/or controller 115) can be configured for: (a) receiving this plug signal; (b) for outputting an adjustment signal, based at least in part on the plug signal, so as to adjust windguard assembly 128 so as to remove the plug of crop material 136 and thereby to move windguard assembly to second position 338; and (c) after removal of the plug, for outputting an additional adjustment signal, based at least in part upon another position signal indicative of windguard assembly 128 being in second position 338 and another signal indicative of the removal of the plug of crop material (i.e., another optical signal indicating a profile, or lack thereof, of crop material 136, or a weight or mass of crop material 136, indicating an absence of the plug), for moving windguard assembly 128 back to first position 237 for normal operation of baler 101.

In use, windguard assembly 128 can initially be in first position 237, the normal operating position. To remove a crop plug, latch 271 can be pivoted counter-clockwise (either manually by a rope or cable connected to hole 381, or by an actuator, or another trigger associated with baler 101); for instance, control system 129 may be configured to prompt the user to release latch 271 during an automatic series of actions. Upon doing so, by action of crop material in reverse (such as by way of reversing rotors 144, by way of reversing tines 240 of pickup assembly 111, and/or by moving baler 101 backwards) arm 270 can be pushed forward by crop material and thereby slid from rearward position 272 to forward position 373 in slots 274, which places windguard assembly 128 in second position 338. This sliding action can be triggered by a command inputted into control system 129 by user to remove a crop plug in feeder system 108 (such as by reversing rotors 144), or a crop plug can be sensed by control system 129, which then can automatically cause a series of actions so as to automatically remove the crop plug (such as with, but not limited to, autonomous tractor and/or baler operations), though control system 129 may prompt user to release latch 271. Alternatively, actuator 251 can move windguard assembly 121 forward, or a user can do this manually. Positioning windguard assembly 128 in second position 338 creates space and prevents tines 260 from acting as barbs relative to the crop plug when the crop flow is reversed (133), with arm 270 forward in forward position 373 and tine mechanism 248 pivoted to up position 368. After removing the crop plug, windguard assembly 128 can be returned to first position 237, by driving tractor 100 and thus baler 101 forward into the ejected pile of crop material 136 and/or the windrow of crop material 136, so that the crop material 136 pushes windguard assembly 128 back into first position 237 (this can be assisted by rotating rotors 144 in their normal direction 134). Alternatively, windguard assembly 128 can be returned to first position 237 manually, or automatically by control system 129. When shaft 275 of arm 270 contacts a leading edge of latch 271 as arm 270 slides rearward in slots 274, latch 271 can be caused to pivot up so that arm 270 can proceed rearwardly and seat in rearward position 272, with tine mechanism 248 again in down position 267. Further, a user may find it advantageous to move windguard assembly to second position 338 (or at some intermediate position between first and second positions 237, 338) in order to create space in, and thereby improve accessibility to, feeder system 108 and thereby to conduct maintenance of feeder system 108 or any other aspect of baler 101, such as for maintenance of pickup assembly 111, rotary feeder assembly 121, windguard assembly 128, and/or for replacement of tines 240 or hoops (i.e., which tines 240 pass between).

Further, yet another embodiment of the present invention is provided. That is, the windguard assembly of the present invention can be mounted to baler tongue 107. Thus, any of the embodiments of the windguard assembly according to the present invention can be adapted so as to mount to tongue 107. Further, in accordance with yet another embodiment of the present invention, the windguard assembly may omit the roller, or may have a baffle in place of tines.

Further, according to yet another embodiment of the present invention, the windguard assembly can move between the first and second positions as the windguard assembly rides atop the crop material when the rotor feed assembly 121 is reversed. The primary difference, however, is that the windguard assembly does not have a sliding action within a slot, such as slot 274. Instead, the windguard assembly can primarily be a four-bar linkage, which rotates and which moves between a retracted position and an extended position. This embodiment is not specifically shown.

Figure 6:
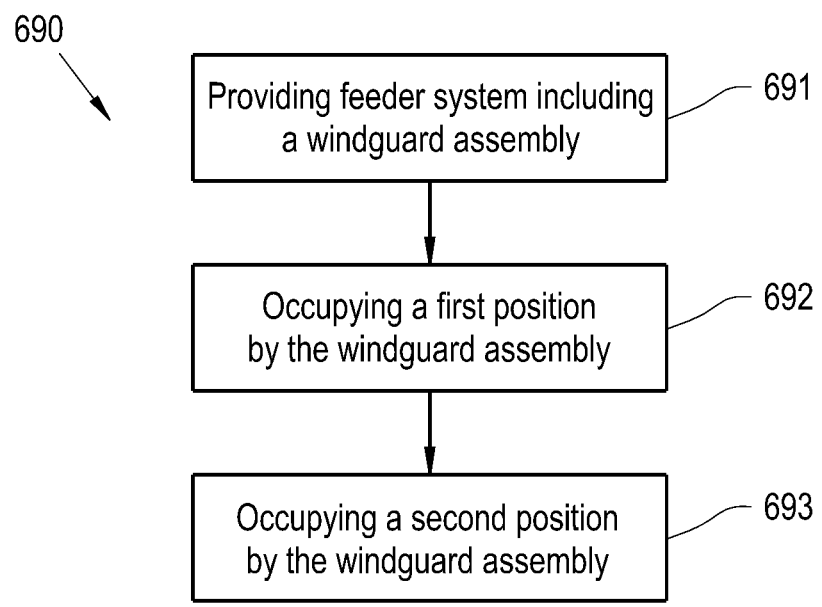
FIG. 6 illustrates a flow diagram showing a method of using an agricultural baler, in accordance with an exemplary embodiment of the present invention.

Referring now to FIG. 6, there is shown a flow diagram showing a method 690 of using an agricultural baler 101, the method 690 including the steps of: providing 691 a baler frame 130 and a feeder system 108, the feeder system 108 being coupled with the baler frame 130 and including a windguard assembly 128; occupying 692 selectively, by the windguard assembly 128, a first position 237, the first position 237 being associated with a normal flow direction 132 of a crop material 136 relative to the feeder system 108; and occupying 693 selectively, by the windguard assembly 128, a second position 338 by moving between the first position 237 and the second position 338, the second position 338 being associated with a reversal 133 of the normal flow direction 132 of the crop material 136. The windguard assembly 128 can be configured for selectively occupying the first position 238 and the second position 339 by moving therebetween and thereby by sliding therebetween. The feeder system 108 includes a pickup assembly 111 and a rotary feeder assembly 121 each of which is coupled with the baler frame 130, the windguard assembly 128 being coupled with the pickup assembly 111, the rotary feeder assembly 121 including a rotor device 144, the second position 338 being associated with a reversed operation of the rotor device 144. The windguard assembly 128 can include an arm 270 slidably coupled with the pickup assembly 111 such that the arm 270 is configured for sliding between a rearward position 272 and a forward position 373, the rearward position 272 being associated with the first position 237, the forward position 373 being associated with the second position 338. The windguard assembly 128 can include: a tine mechanism 248 pivotably coupled with the arm 270; and a linkage assembly 250 coupled with the pickup assembly 111, the arm 270, and the tine mechanism 248 and configured for moving the tine mechanism 248 between a down position 267 and an up position 368 when the arm 270 slides between the rearward position 272 and the forward position 373, respectively. The linkage assembly 250 can be rigidly coupled with the tine mechanism 248, the pickup assembly 111 further including a latch 271 configured for selectively latching the arm 270 in the first position 237.

It is to be understood that the steps of method 690 may be performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 690, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 690.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A windguard assembly for a feeder system of an agricultural baler, the agricultural baler including a baler frame, the feeder system being coupled with the baler frame, the feeder system including a pickup assembly, the windguard assembly comprising:
   an arm configured to be pivotably coupled to the pickup assembly;
   a roller rotatably coupled to the arm, the roller having a first position with respect to the pickup assembly associated with a normal flow direction of a crop material relative to the feeder system and a second position with respect to the pickup assembly associated with a reversal of the normal flow direction of the crop material;
a tine mechanism pivotably coupled with the arm; and
a linkage assembly coupled with the pickup assembly, the arm, and the tine mechanism and configured for moving the tine mechanism between a down position when the roller is in the first position and an up position when the roller is in the second position.

2. The windguard assembly of claim 1, wherein the second position is associated with a reversed operation of a rotor device of a rotary feeder assembly, which is coupled with the baler frame.

3. The windguard assembly of claim 2, wherein the arm if further configured for being slidably coupled with the pickup assembly such that the arm is configured for sliding between a rearward position and a forward position, the rearward position being associated with the first position, the forward position being associated with the second position.

4. The windguard assembly of claim 1, wherein the linkage assembly is rigidly coupled with the tine mechanism.

5. An agricultural machine, comprising:
a machine frame; and
a feeder system coupled with the machine frame and including a pickup assembly and a windguard assembly, the windguard assembly comprising:
an arm configured to be pivotably coupled to the pickup assembly;
a roller rotatably coupled to the arm, the roller having a first position with respect to the pickup assembly associated with a normal flow direction of a crop material relative to the feeder system and a second position with respect to the pickup assembly associated with a reversal of the normal flow direction of the crop material;
a tine mechanism pivotably coupled with the arm; and
a linkage assembly coupled with the pickup assembly, the arm, and the tine mechanism and configured for moving the tine mechanism between a down position when the roller is in the first position and an up position when the roller is in the second position.

6. The agricultural machine of claim 5, wherein the agricultural machine is an agricultural baler and the machine frame is a baler frame, the feeder system including a rotary feeder assembly coupled with the baler frame, the rotary feeder assembly including a rotor device, the second position being associated with a reversed operation of the rotor device.

7. The agricultural machine of claim 6, wherein the arm is slidably coupled with the pickup assembly such that the arm is configured for sliding between a rearward position and a forward position, the rearward position being associated with the first position, the forward position being associated with the second position.

8. The agricultural machine of claim 5, wherein the linkage assembly is rigidly coupled with the tine mechanism, the pickup assembly further including a latch configured for selectively latching the arm in the first position.

9. A method of using an agricultural baler, the method comprising the steps of:
providing a baler frame and a feeder system, the feeder system being coupled with the baler frame and including a pickup assembly and a windguard assembly, the windguard assembly comprising an arm configured to be pivotably coupled to the pickup assembly, a roller rotatably coupled to the arm, the roller having a first position with respect to the pickup assembly associated with a normal flow direction of a crop material relative to the feeder system and a second position with respect to the pickup assembly associated with a reversal of the normal flow direction of the crop material, a time mechanism pivotably coupled with the arm, and a linkage assembly coupled with the pickup assembly, the arm, and the tine mechanism and configured for moving the tine mechanism between a down position when the roller is in the first position and an up position when the roller is in the second position;
occupying selectively, by the roller, a first position, with the tine mechanism in the down position, the first position being associated with a normal flow direction of a crop material relative to the feeder system; and
occupying selectively, by the roller, a second position with the fine mechanism in the down position the second position being associated with a reversal of the normal flow direction of the crop material.

10. The method of claim 9, wherein the windguard assembly is configured for selectively occupying the first position and the second position by moving therebetween and thereby by sliding therebetween, the feeder system including a rotary feeder assembly coupled with the baler frame, the rotary feeder assembly including a rotor device, the second position being associated with a reversed operation of the rotor device.

11. The method of claim 10, wherein the arm is configured for sliding between a rearward position and a forward position, the rearward position being associated with the first position, the forward position being associated with the second position.

12. The method of claim 9, wherein the linkage assembly is rigidly coupled with the tine mechanism, the pickup assembly further including a latch configured for selectively latching the arm in the first position.

* * * * *